United States Patent
Clerget et al.

(10) Patent No.: US 9,546,715 B2
(45) Date of Patent: Jan. 17, 2017

(54) DEVICE FOR MANUALLY ACTUATING A PIECE OF CLOSING OR SUN PROTECTION EQUIPMENT

(71) Applicant: Somfy SAS, Cluses (FR)

(72) Inventors: Sergyl Clerget, Bluffy (FR); Thierry Garby, Chatillon sur Cluses (FR)

(73) Assignee: SOMFY SAS, Cluses (FR)

( * ) Notice: Subject to any disclaimer, the term of this patent is extended or adjusted under 35 U.S.C. 154(b) by 0 days.

(21) Appl. No.: 14/323,291

(22) Filed: Jul. 3, 2014

(65) Prior Publication Data

US 2015/0013484 A1    Jan. 15, 2015

(51) Int. Cl.
| | | |
|---|---|---|
| A47G 5/02 | (2006.01) | |
| F16H 19/02 | (2006.01) | |
| E06B 9/74 | (2006.01) | |
| E06B 9/76 | (2006.01) | |
| B60J 11/00 | (2006.01) | |
| F16H 1/16 | (2006.01) | |

(52) U.S. Cl.
CPC ............... F16H 19/02 (2013.01); B60J 11/00 (2013.01); E06B 9/74 (2013.01); E06B 9/76 (2013.01); F16H 1/16 (2013.01); Y10T 74/18792 (2015.01)

(58) Field of Classification Search
CPC ............ E06B 9/68; E06B 9/72; E06B 9/76; E06B 9/32; E06B 9/40; E06B 9/42; Y10T 24/44026; Y10T 24/45099; Y10T 24/45785; A47J 45/07; A46C 2013/223; B25G 3/02; B25G 3/04; B25G 3/06; B25G 3/08; B25G 3/10; B25G 3/12; B25G 3/14; B25G 3/16; B25G 3/18
USPC ............. 160/176.1 R, 176.1 P, 176.1 V, 309, 330,160/911; 403/248, 252, 254, 360, 258, 259, 261

See application file for complete search history.

(56) References Cited

U.S. PATENT DOCUMENTS

| | | | | |
|---|---|---|---|---|
| 4,417,185 A | | 11/1983 | Bullat | |
| 4,422,493 A | * | 12/1983 | Forquer | .................... E06B 9/76 160/133 |
| 4,503,899 A | * | 3/1985 | Forquer | .................. E06B 9/174 160/133 |

(Continued)

FOREIGN PATENT DOCUMENTS

| | | |
|---|---|---|
| EP | 2 503 091 A | 9/2012 |
| FR | 2 480 846 A | 10/1981 |

OTHER PUBLICATIONS

Search Report from French Patent Office for priority application FR 1356594 mailing date Jan. 23, 2014.

*Primary Examiner* — Katherine Mitchell
*Assistant Examiner* — Jeremy Ramsey
(74) *Attorney, Agent, or Firm* — Frommer Lawrence & Haug LLP

(57) ABSTRACT

The invention relates to a device (32) for manually actuating a piece of closing or sun protection equipment (10), in particular of the blinds or rolling shutters type, including a stationary case (42) having two aligned bearings (44) defining an axis of rotation (200), a worm (34) guided in rotation in the bearings (44) and a driving rod (54) to rotate the worm (34). The worm (34) being passed through by an axial hole (52), the driving rod (54) being able to be inserted in the axial hole (52) by securing the driving rod (54) in rotation with the worm (34). A snapping connection between an elastically deformable staple (56) and a bearing shoulder (64) allows the insertion of the driving rod (54) into the axial hole (52), and blocking the removal of the driving rod (54) inserted into the axial hole (52).

9 Claims, 2 Drawing Sheets

(56) References Cited

U.S. PATENT DOCUMENTS

| | | | | |
|---|---|---|---|---|
| 5,092,387 | A | | 3/1992 | King et al. |
| 5,117,893 | A | * | 6/1992 | Morrison .................. E06B 9/68 |
| | | | | 160/133 |
| 5,711,360 | A | * | 1/1998 | Viotte ........................ E06B 9/62 |
| | | | | 160/133 |
| 5,924,467 | A | * | 7/1999 | Allsopp .................. E06B 9/362 |
| | | | | 160/177 V |
| 2015/0225997 | A1 | * | 8/2015 | Soper ........................ E06B 9/42 |
| | | | | 160/309 |

* cited by examiner

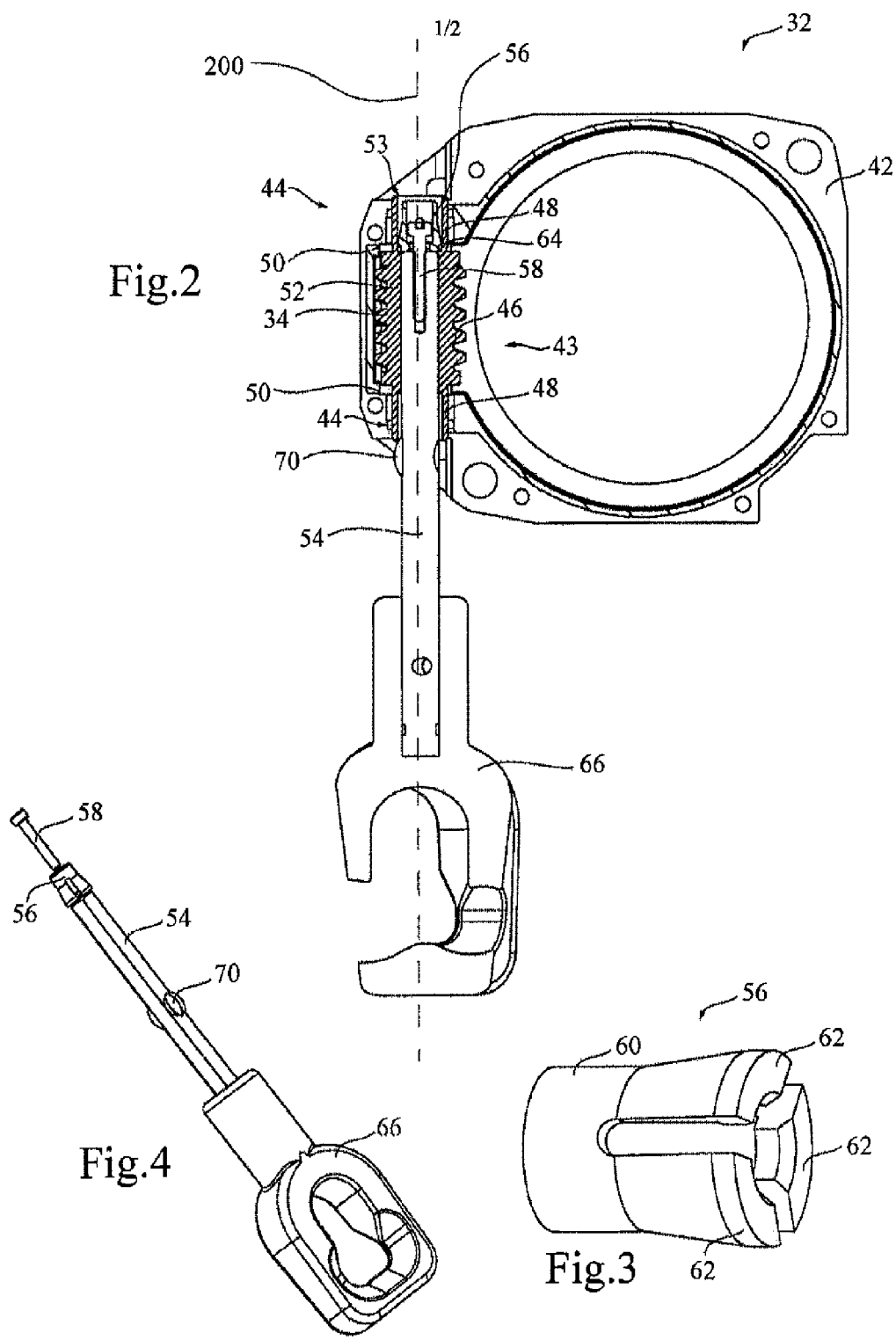

DEVICE FOR MANUALLY ACTUATING A PIECE OF CLOSING OR SUN PROTECTION EQUIPMENT

TECHNICAL FIELD OF THE INVENTION

The invention relates to the manual driving of a piece of home automation equipment, and in particular, although not exclusively, backup driving of a piece of home automation equipment that is otherwise motorized.

BACKGROUND OF THE INVENTION

Many motorized moving pieces of home automation equipment, in particular screens, blinds and rolling shutters of all types, are equipped with a backup manual driving device with a crank, the latter driving an intermediate gear reducing stage such as a worm, designed to drive the moving element of the home automation equipment if the motor fails. One example of such a device is given by document FR 2,480,846. On the one hand, the device includes a motorized drive device, or actuator, with an electric motor and a tubular casing designed to be housed in a rolling tube for blinds, shutters or similar members, and on the other hand includes a mechanism that can be actuated manually, capable of rotating the tubular case of the motor. The driveshaft of the actuator is kinematically rotatably connected to the winding tube, a first device being provided to immobilize the rotation of the case, such that when the motor is operating, the output shaft of the actuator rotates the winding tube around the case. A second device is provided to immobilize the rotation of the winding tube relative to the tubular case, such that when the motor is not operating, the winding tube can be driven manually by the rotation of the tubular case of the actuator around itself. The mechanism able to be actuated manually includes a drive wheel secured in rotation with the tubular case and concentric thereto, driven by a worm formed at the end of a rod driven by a crank. The rod and the worm being formed in a single piece, it is not possible to choose the length of the rod based on the installation conditions of the apparatus, or to completely omit it if it is unwanted in certain applications.

The search for delayed industrial differentiation between different versions proposed within a line of equipment leads to separating the worm from the rod, as for example proposed in document EP 2,503,091, which shows a worm passed through by a hole with a hexagonal section allowing the insertion of a rod with a complementary section, the final axial position of which is determined by an annular washer. However, this assembly must nevertheless be done in the plant, since the operation requires opening the cover of the mechanism and is outside the scope of the installer's responsibility. The rod is therefore part of the complete shipped mechanism assembled by the manufacturer. The bulk of the preassembled mechanism results in high packaging costs, and risks of breaking during transport and handling.

BRIEF DESCRIPTION OF THE INVENTION

The invention aims to resolve the drawbacks of the state of the art, and in particular to facilitate assembly and reduce breaking risks of such a product. It in particular aims to make it possible to further delay the assembly of the rod.

To that end, proposed according to a first aspect of the invention is a manual actuating device for actuating a piece of closing or sun protection equipment, in particular of the blinds or rolling shutters type, the device including a stationary case having a main cavity, a worm guided in rotation in the main cavity and a driving rod to rotate the worm, the worm being passed through by an axial hole, the driving rod being able to be inserted in the axial hole by securing the driving rod in rotation with the worm, the device being provided with a snapping connection between an elastically deformable staple and a bearing shoulder allowing the insertion of the driving rod into the axial hole, and blocking the removal of the driving rod inserted into the axial hole.

The fastening solution by snapping is particularly easy to implement and makes it possible to entrust the installer with the assembly of the rod in the hole of the worm. The body of the mechanism and the rod can be packaged and shipped separately.

A same mechanism body, including the case and the worm, can be associated with a plurality of rods with different dimensions. If applicable, during assembly, the installer can have rods with different lengths at his disposal and choose that which is best suited based on the conditions encountered.

Furthermore, the simplicity of assembling the rod in the screw makes it possible to consider not assembling the rod in the worm until after the case bearing the worm has been assembled on the equipment, or after the assembly made up of the motorized home automation equipment and the case bearing the worm has been attached in its final location in the building.

According to one preferred embodiment, the elastic staple is fastened to the driving rod, preferably at one free end of the driving rod, for example using a screw. The elastic staple is then visible before assembly, and the installer needs practically no instructions to understand how to perform the assembly. Preferably, the shoulder is formed on the worm, this solution having the advantage of not creating relative rotation between the elastic staple and shoulder during operation. It is also possible to consider providing that the shoulder is formed directly on the casing.

Advantageously, it is possible to provide that the worm has an extension in which the elastic staple is housed, which makes it possible to protect the elastic staple. This extension can advantageously be located at the height of one of the bearings, to limit the axial bulk.

According to another embodiment, the elastic staple is fastened to the worm or the case, the shoulder being formed on the driving rod.

In all of the embodiments, it is advantageous for the shoulder to be annular. Preferably, the elastic staple comprises at least two deformable tongues surrounding the axis of rotation.

Preferably, the main cavity is a through cavity. It is thus possible to access the cavity through an opening opposite the insertion opening for the rod, for example for a maintenance operation on the worm or for disassembly.

Advantageously, the main cavity is symmetrical relative to a plane of symmetry, which makes it possible to consider, with a same assembly, lateralized assemblies at either end of the closing or sun protection equipment.

According to another aspect, the invention relates to closing or sun protection equipment, including a winding tube for a screen, a toothed wheel, a drive train between the toothed wheel and the winding tube, and a manual actuating device as previously described, the toothed wheel meshing with the worm of the manual actuating device. The equipment may or may not be motorized.

According to another aspect, the invention relates to an apparatus for driving a piece of closing or sun protection equipment, including an electric motor including a casing and a rotor rotating around a main geometric axis, a toothed wheel rotating around the main geometric axis and a drive train between the toothed wheel and the rotor, as well as a manual actuating device as previously described, the toothed wheel meshing with the worm of the manual actuating device.

BRIEF DESCRIPTION OF THE FIGURES

Other features and advantages of the invention will emerge from reading the following description, in reference to the appended figures, which illustrate:

FIG. 2, a cross-sectional view of a manual actuating device of the equipment of FIG. 1;

FIG. 3, an isometric view of an elastic staple of the manual actuating device of FIG. 2;

FIG. 4, an exploded view of part of the manual actuating device of FIG. 2;

For greater clarity, identical elements are identified using identical reference signs in all of the figures.

DETAILED DESCRIPTION OF THE INVENTION

Figure 1:
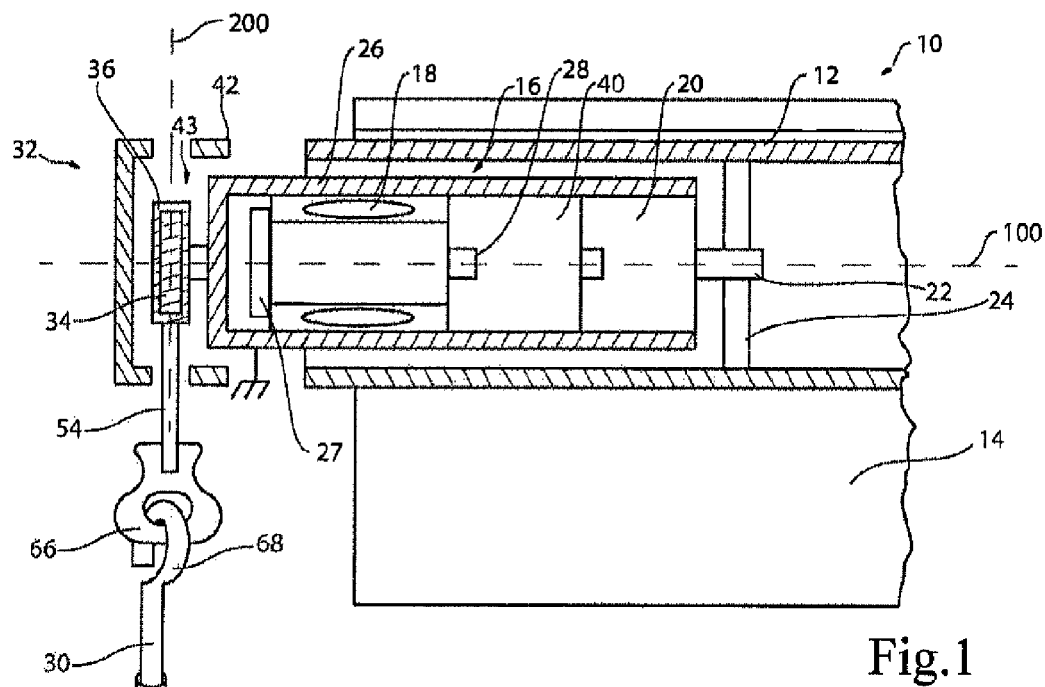
FIG. 1, a diagrammatic view of a piece of closing or sun protection equipment according to one aspect of the invention.

FIG. 1 diagrammatically illustrates a piece of home automation equipment 10 including a winding tube 12 for a covering or projection screen or rolling shutters 14, rotating around a reference axis 100 and inside which a motorized drive device 16 or actuator is partially inserted, including an electric motor 18 coupled to a speed reducer 20, for example irreversible, whereof the output shaft 22 is coupled to the winding tube 12 by means of a drive wheel 24. The motor 18 and the speed reducer 20 are housed inside a shared tubular casing 26 that is stationary and coaxial with the winding tube 12. A control unit 27, preferably positioned at the head of the motor 18, in the casing 26 of the actuator, in particular manages the control of the motor, the power supply, the position metering.

The actuator can also comprise a brake 40 inserted on the drive train between the rotor 28 of the motor and the output shaft. This brake may be an electromagnetic brake, for example a magnetic plate brake, or a mechanical brake. When the motor is stopped, the brake is active and immobilizes the rotation of the winding tube 12 relative to the tubular casing 26.

At the opposite end of the output shaft 22, the actuator comprises a first device for assembly on a stationary structure, immobilizing the rotation of the casing 26 of the actuator, in particular when the mechanism able to be actuated manually is not biased. The tubular casing 26 is mounted with possible rotation on the first device, such that when the device able to be actuated manually is biased, the casing is rotated, thereby rotating the winding tube 12.

The tubular casing 26 is in fact connected to a crank 30 by means of a backup manual actuating device 32 including the worm 34 meshing with a toothed wheel 36 connected to the casing.

The backup manual actuating device 32, illustrated in detail in FIGS. 2 to 4, includes a case 42 provided with a main cavity 43 in which the worm 34 is guided in rotation by two aligned plain bearings 44, defining an axis of rotation 200 that is transverse (here, perpendicular) to the axis 100 of rotation of the toothed wheel 36. The worm 34 includes a driving thread 46 and, axially on either side of the thread, two smooth cylindrical steps 48 journaling in the plain bearings 44 so as to guide the worm 34 in rotation around the axis of rotation 200. The main cavity 43 has shoulders 50 preventing any axial movement of the worm.

The worm 34 is passed through by an axial hole 52 with a non-circular section, preferably polygonal, for example hexagonal, extended by a hollow cylindrical extension 53 with a section larger than the axial hole 52 and coinciding with one of the smooth cylindrical steps 48. The manual driving device 32 is completed by a driving rod 54 that has a corresponding section, also polygonal, and dimensions allowing it to be inserted into the axial hole 52 to secure the rod 54 in rotation with the worm 34. A tip forming an elastically deformable staple 56 is fastened to the free end of the rod 54 using a screw 58. The elastic staple 56, illustrated in FIG. 3, has a cylindrical base 60 and three elastic tongues 62 at the periphery of the base and extending it axially while gradually flaring. When the rod 54 is inserted into the hole 52 of the worm 34, the tongues 62 of the elastic staple 56 withdraw by deforming elastically until the rod 54 reaches its final position illustrated in FIG. 2, in which the elastic staple 56 is housed in the cylindrical extension 53. The elastic staple 56 then elastically returns to its unbiased shape and bears against an annular shoulder 64 formed at the junction between the cylindrical extension 53 and the axial hole 52, blocking the withdrawal of the rod 54 inserted into the axial hole 52. The main cavity 43 as well as the cylindrical extension 53 of the worm are preferably open and accessible from the outside, for example through an opening of the case 32, to make access to the screw 58 and disassembly of the elastic staple 56 and the rod 54 possible. At its opposite end, the rod 54 is provided with a ring 66 in which a hook 68 of the crank 30 is inserted. One or more stop elements 70 can be formed on the rod, the latter being in contact with the case 42 or the worm 34 when the rod has reached its final position.

Preferably, the main cavity 43 for receiving the worm, as well as the worm itself, are symmetrical, such that the rod can be inserted through either of the ends of the cavity 43, based on the assembly configurations of the motorized drive device 16 and such that the elastic staple can be retained, irrespective of the assembly direction.

Alternatively, the elastic staple can be received during assembly in a secondary cavity of the case, performing the same functions as the axial extension of the worm. It is then possible to imagine that the rod itself is assembled guided in the plain bearings, and not the worm.

The method for fastening the driving rod 54 to the worm 34 is extremely simple and reliable, which makes it possible to deliver the manual actuating device 32 in two batches, one consisting of the case 42 and the worm 34, assembled or ready to assemble on the main casing 26, and the other made up of the driving rod 54, the elastic staple 56 and the screw 58, in separate or preassembled parts. The installer then need only finalize the assembly, insert the driving rod 54 equipped with the elastic staple 56 into the hole 52 of the worm 34 until the final axial position is reached, before or preferably after assembling the case 42 on the main casing 26.

Naturally, many alternatives are possible. It is thus possible to provide that the elastic staple bears against a shoulder formed on the case. It is also possible to provide elastic staple formed on the worm or on the case, and a shoulder being formed on the rod. Furthermore, the same type of fastening by elastic staple between the rod and the worm can be considered for non-motorized equipment.

The drive train from the toothed wheel to the rotor 28 or to the output shaft 22 can be of any known type.

Figure 5:
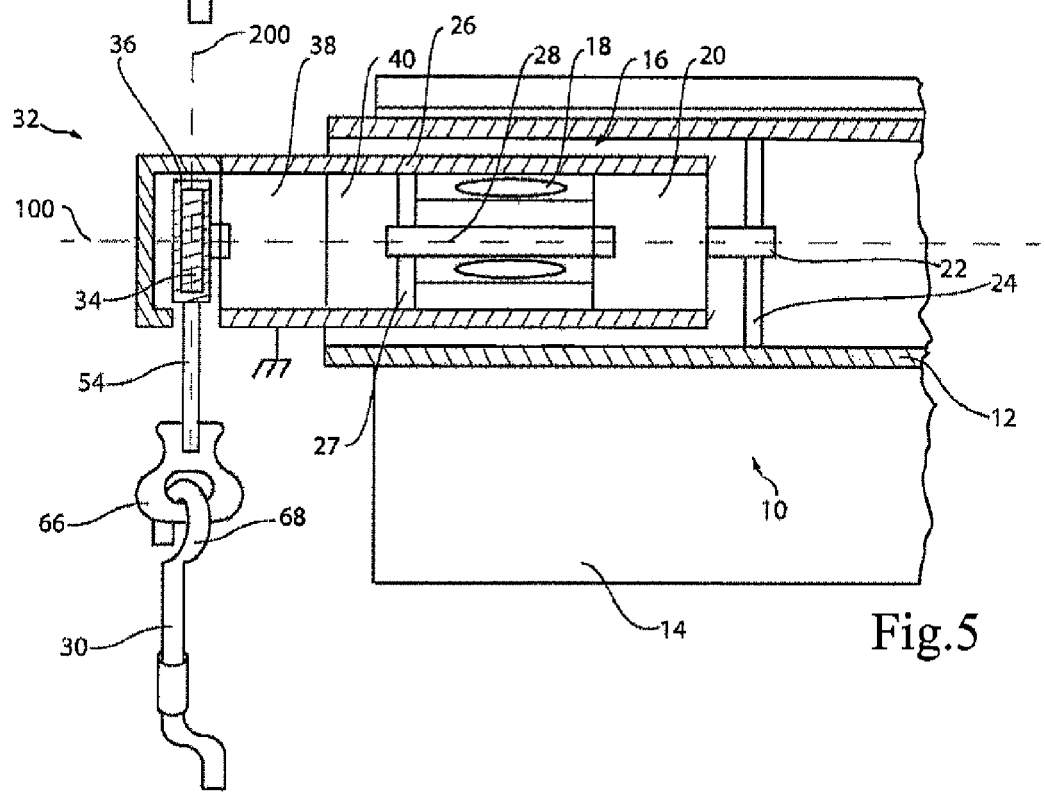
FIG. 5, a diagrammatic view of a piece of closing or sun protection equipment according to another embodiment of the invention.

According to one alternative embodiment illustrated in FIG. 5, the backup manual actuating device rotates not the tubular casing 26, but the rotor 28 of the motor when the crank 30 is manually actuated. In that case, the toothed wheel 36 meshing with the worm 34 is connected to a two-way coupler 38, which in turn is connected to an electromagnetic clutch 40. The two-way coupler 38 can be a freewheel coupler that serves to transmit any motor torque exerted by the worm 34 to an intermediate rotating member, and to secure the intermediate rotating member to the case 42 in the absence of motor torque exerted by the worm 34. The purpose of the electromagnetic clutch 40 is to separate the intermediate rotating member and the two-way coupler 38 of the rotor 28 from the motor when the latter is operating, and to couple the intermediate rotating member and the two-way coupler 38 to the rotor 28 of the motor 18 when the latter is not supplied with electricity. The electromagnetic clutch 40 can also have a torque limiting function, to prevent excessive torque applied with the crank 30 from being transmitted in full to the speed reducer 20, at the risk of damaging the latter.

The invention claimed is:

1. A device for manually actuating closure equipment or sun protection equipment, the device including a stationary case having a main cavity, a worm guided in rotation in the main cavity and a driving rod to rotate the worm, the worm being passed through by an axial hole, the driving rod being able to be inserted in the axial hole by securing the driving rod in rotation with the worm, wherein the device is provided with a snapping connection between an elastically deformable staple and a bearing shoulder, allowing the insertion of the driving rod equipped with the elastically deformable staple into the axial hole, and blocking the removal of the driving rod inserted into the axial hole, the main cavity is a through cavity comprising an insertion opening for inserting the driving rod and a maintenance opening opposite the insertion opening, and the elastically deformable staple is releasably fastened to the driving rod and is released from the driving rod through the maintenance opening.

2. The device according to claim 1, wherein the shoulder is formed on the worm.

3. The device according to claim 1, wherein the worm has an extension in which the elastic staple is housed.

4. The device according to claim 1, wherein the shoulder is annular.

5. The device according to claim 1, wherein the elastic staple comprises at least two deformable tongues surrounding the axis of rotation.

6. A closure or sun protection equipment, including a winding tube for a screen, a toothed wheel, a drive train between the toothed wheel and the winding tube, and a manual actuating device including a stationary case having a main cavity, a worm guided in rotation in the main cavity and a driving rod to rotate the worm, the worm being passed through by an axial hole, the driving rod being able to be inserted in the axial hole by securing the driving rod in rotation with the worm, wherein the device is provided with a snapping connection between an elastically deformable staple and a bearing shoulder, allowing the insertion of the driving rod equipped with the elastically deformable staple into the axial hole, and blocking the removal of the driving rod inserted into the axial hole, the toothed wheel meshing with the worm of the manual actuating device, the main cavity is a through cavity comprising an insertion opening for inserting the driving rod and a maintenance opening opposite the insertion opening, and the elastically deformable staple is releasably fastened to the driving rod and is released from the driving rod through the maintenance opening.

7. An apparatus for driving a closure or sun protection equipment, including an electric motor including a casing and a rotor rotating around a main geometric axis, a toothed wheel rotating around the main geometric axis, a drive train between the toothed wheel and the rotor and a manual actuating device including a stationary case having a main cavity, a worm guided in rotation in the main cavity and a driving rod to rotate the worm, the worm being passed through by an axial hole, the driving rod being able to be inserted in the axial hole by securing the driving rod in rotation with the worm, wherein the device is provided with a snapping connection between an elastically deformable staple and a bearing shoulder, allowing the insertion of the driving rod equipped with the elastically deformable staple into the axial hole, and blocking the removal of the driving rod inserted into the axial hole, the toothed wheel meshing with the worm of the manual actuating device, the main cavity is a through cavity comprising an insertion opening for inserting the driving rod and a maintenance opening opposite the insertion opening, and the elastically deformable staple is releasably fastened to the driving rod and is released from the driving rod through the maintenance opening.

8. The device according to claim 1, wherein the closure or sun protection equipment is a blind or a rolling shutter.

9. The device according to claim 1, wherein the elastic staple is fastened at one free end of the driving rod.

* * * * *